United States Patent
Lee et al.

(10) Patent No.: US 8,255,081 B2
(45) Date of Patent: Aug. 28, 2012

(54) APPARATUS AND METHOD FOR CALCULATING POSITION OF ROBOT

(75) Inventors: Hyoung-Ki Lee, Suwon-si (KR); Ki-Wan Choi, Anyang-si (KR); Ji-Young Park, Daejeon (KR); Seok-Won Bang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1006 days.

(21) Appl. No.: 12/232,255

(22) Filed: Sep. 12, 2008

(65) Prior Publication Data

US 2009/0076651 A1    Mar. 19, 2009

(30) Foreign Application Priority Data

Sep. 14, 2007 (KR) .................. 10-2007-0093751

(51) Int. Cl.
*G06F 19/00* (2011.01)

(52) U.S. Cl. .................. 700/245; 700/248; 318/568.12; 701/23; 219/125.12; 901/1; 901/40; 342/357.31

(58) Field of Classification Search .................. 700/245, 700/248; 318/568.12; 701/23, 196, 207, 701/213, 300; 425/62, 72.1, 110, E21.228, 425/326.1, 387.1; 414/744.5; 342/357.31; 219/125.12; 901/1, 40; 702/196; 427/348; 118/62; 257/E21.228; 134/182, 902; 74/490.03
See application file for complete search history.

(56) References Cited

U.S. PATENT DOCUMENTS

| | | | | |
|---|---|---|---|---|
| 5,019,824 | A | | 5/1991 | Kumar |
| 5,065,834 | A | * | 11/1991 | Hirabayashi et al. ......... 180/197 |
| 5,394,322 | A | * | 2/1995 | Hansen ............................ 700/37 |
| 5,842,754 | A | * | 12/1998 | Sano .............................. 303/147 |
| 6,311,129 | B1 | | 10/2001 | Lin |
| 6,496,755 | B2 | * | 12/2002 | Wallach et al. ................ 700/245 |
| 6,634,218 | B1 | * | 10/2003 | Nakanishi et al. .......... 73/116.05 |
| 7,272,467 | B2 | * | 9/2007 | Goncalves et al. ............ 700/245 |
| 7,539,557 | B2 | * | 5/2009 | Yamauchi ...................... 700/245 |
| 7,984,189 | B2 | * | 7/2011 | Terai et al. .................... 709/246 |
| 2005/0225477 | A1 | * | 10/2005 | Cong et al. ...................... 342/70 |
| 2006/0095169 | A1 | | 5/2006 | Minor et al. |
| 2009/0037033 | A1 | * | 2/2009 | Phillips et al. ..................... 701/2 |
| 2011/0106339 | A1 | * | 5/2011 | Phillips et al. ..................... 701/2 |

FOREIGN PATENT DOCUMENTS

| | | |
|---|---|---|
| KR | 10-2004-0089883 | 10/2004 |
| KR | 10-2005-0063546 | 6/2005 |
| KR | 10-2007-0072306 | 7/2007 |

\* cited by examiner

*Primary Examiner* — James Trammell
*Assistant Examiner* — McDieunel Marc
(74) *Attorney, Agent, or Firm* — Staas & Halsey LLP

(57) ABSTRACT

Provided are an apparatus and method of calculating the position of a robot, which determine the position of a robot and create a map of the surroundings of the robot which account for the travel state of the robot. The apparatus includes a state variable calculation module which calculates a plurality of state variables regarding a travel state of the robot by using a plurality of Kalman filters; a travel state determination module which determines the travel state of the robot based on the results of the calculation performed by the state variable calculation module; and a state variable update module which updates the state variables according to the result of the determination performed by the travel state determination module.

20 Claims, 9 Drawing Sheets

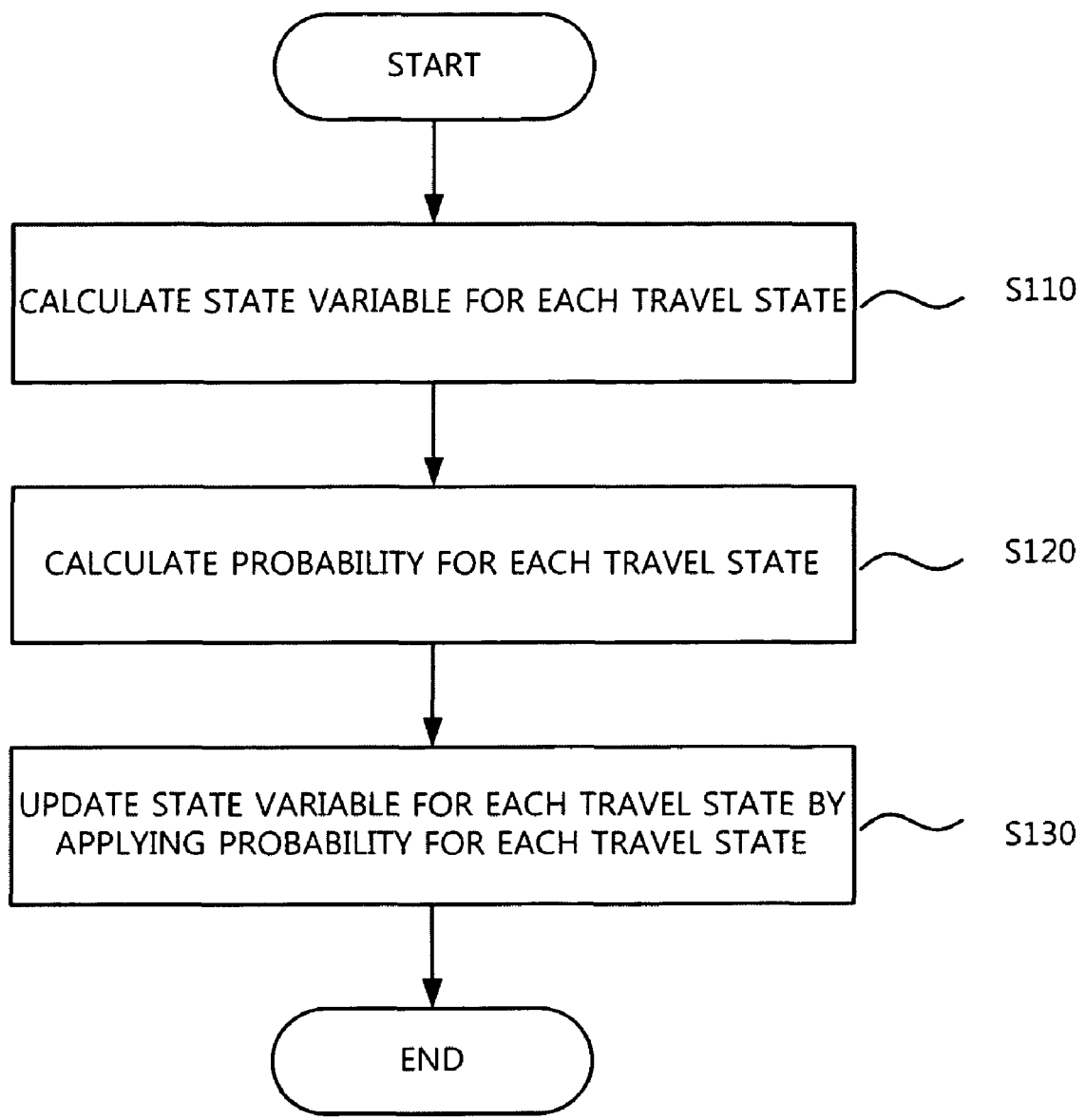

APPARATUS AND METHOD FOR CALCULATING POSITION OF ROBOT

CROSS-REFERENCE TO RELATED APPLICATIONS

This application claims priority from Korean Patent Application No. 10-2007-0093751 filed on Sep. 14, 2007 in the Korean Intellectual Property Office, the disclosure of which is incorporated herein by reference in its entirety.

BACKGROUND

1. Field

The present invention relates to an apparatus and method of calculating the position of a robot, and, more particularly, to an apparatus and method of calculating the position of a robot, which is capable of determining the position of a robot and creating a map of the surroundings of the robot which account for the travel state of the robot.

2. Description of the Related Art

Techniques to determine the position of a robot and creating a map of the surroundings of the robot are one of the most important techniques in the manufacture of a robot. Simultaneous Localization And Map-building (SLAM), which involves the use of a camera or a laser distance meter, has recently been developed.

A SLAM algorithm, which uses a Kalman filter or a particle filter, is divided into a prediction operation and a correction operation. In the prediction operation, the displacement of a robot is measured. In the correction operation, the position of the robot as calculated in the prediction operation is corrected based on absolute coordinate data provided by a camera or a laser distance meter.

In general, in the prediction operation, the number of rotations of each wheel of a robot is measured using an encoder, and the relative position of the robot is calculated based on the result of the measurement. However, if the robot is in a slip state in which wheels slip on the floor, the relative position of the robot may not be able to be precisely determined by an encoder, and, thus, the general performance of a SLAM algorithm may deteriorate.

Therefore, it is necessary to develop ways to properly calculate the position of a robot which account for the travel state of the robot, i.e., whether the robot is in a normal state or in a slip state.

SUMMARY

Accordingly, it is an aspect of the present invention to provide an apparatus and method of calculating the position of a robot, in which a current travel state of a robot is determined by using different Kalman filters for different travel states of the robot and an updated state variable is obtained by combining state variables provided by the different Kalman filters.

Additional aspects and/or advantages will be set forth in part in the description which follows and, in part, will be apparent from the description, or may be learned by practice of the invention.

The foregoing and/or other aspects of the present invention are achieved by providing an apparatus to calculate a position of a robot, the apparatus including: a state variable calculation module which calculates a plurality of state variables regarding a travel state of the robot, comprising a plurality of Kalman filters; a travel state determination module which determines the travel state of the robot based on the calculated state variables; and a state variable update module which updates the state variables according to the determined travel state.

The foregoing and/or other aspects of the present invention are also achieved by providing a method of calculating the position of a robot, the method including: calculating a plurality of state variables regarding a travel state of a robot; determining the travel state of the robot based on the results of the calculating; and updating the state variables according to the result of the determining.

BRIEF DESCRIPTION OF THE DRAWINGS

These and/or other aspects and advantages will become apparent and more readily appreciated from the following description of the embodiments, taken in conjunction with the accompanying drawings of which:

FIG. 10 illustrates a flowchart of a method of calculating the position of a robot according to the embodiment of the present invention.

DETAILED DESCRIPTION OF EMBODIMENTS

Figure 1:
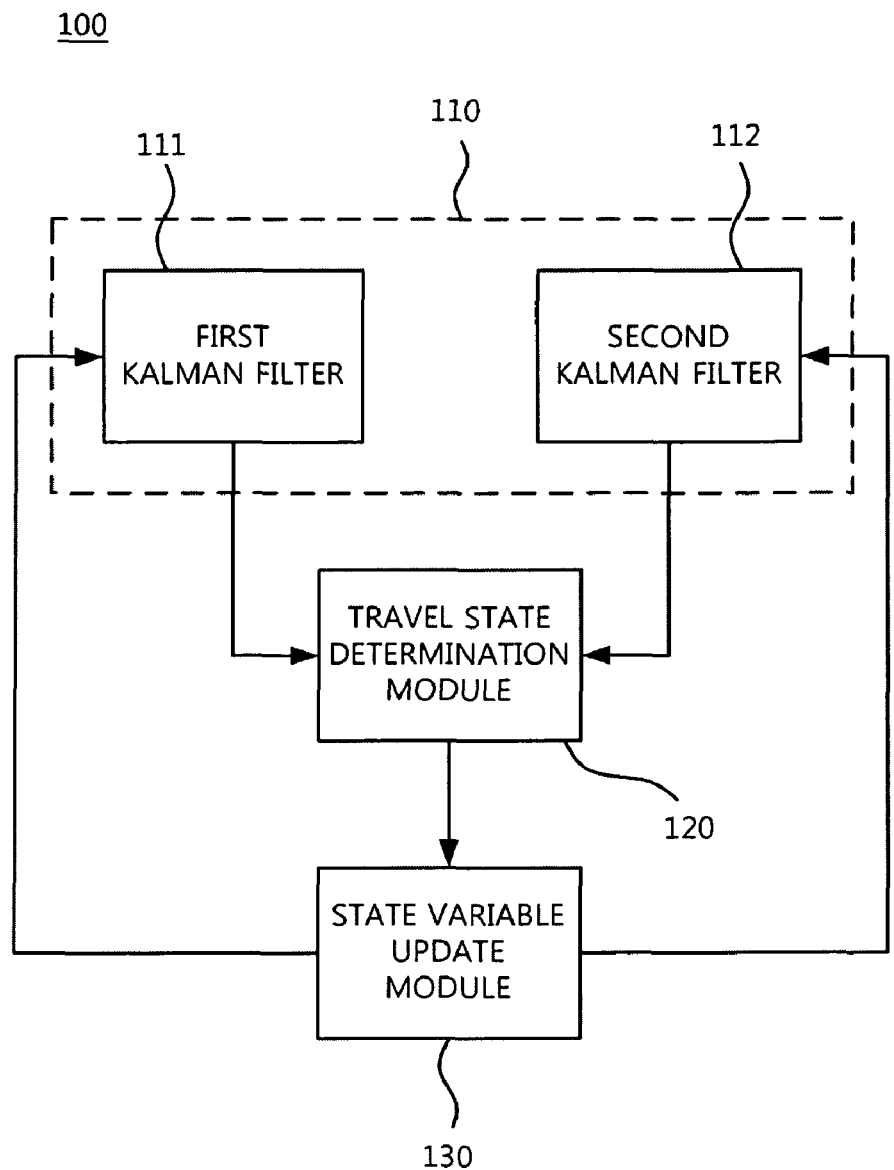
FIG. 1 illustrates a block diagram of an apparatus to calculate the position of a robot according to an embodiment of the present invention.

Reference will now be made in detail to the embodiment, an example of which is illustrated in the accompanying drawings, wherein like reference numerals refer to the like elements throughout. The embodiment is described below to explain the present invention by referring to the figures.

The present invention is described hereinafter with reference to flowchart illustrations of user interfaces, methods, and computer program products according to embodiments of the invention. It should be understood that each block of the flowchart illustrations, and interrelations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means to implement the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause a series of operations to be performed in the computer or other programmable apparatus to produce a computer implemented process such that the instructions that execute on the computer or other programmable apparatus provide operations to implement the functions specified in the flowchart block or blocks.

And each block of the flowchart illustrations may represent a module, segment, or portion of code, which comprises one or more executable instructions to implement the specified logical function(s). It should also be noted that in some alternative implementations, the functions noted in the blocks may occur out of the depicted order. For example, two blocks shown in succession may in fact be executed substantially concurrently or the blocks may sometimes be executed in the reverse order, depending upon the functionality involved.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over a transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of a communication media includes a carrier-wave signal.

FIG. 1 illustrates a block diagram of an apparatus 100 to calculate the position of a robot according to an embodiment of the present invention. Referring to FIG. 1, the apparatus 100 includes a state variable generation module 110 which calculates various state variables regarding the travel state of a robot; a travel state determination module 120 which determines the travel state of the robot based on the results of the calculation performed by the state variable generation module 110; and a state variable update, module 130 which updates the state variables according to the result of the determination performed by the travel state determination module 120.

In the present embodiment, the travel state of a robot is classified as a normal state in which the robot travels normally or a slip state in which the robot slips.

Figure 2:
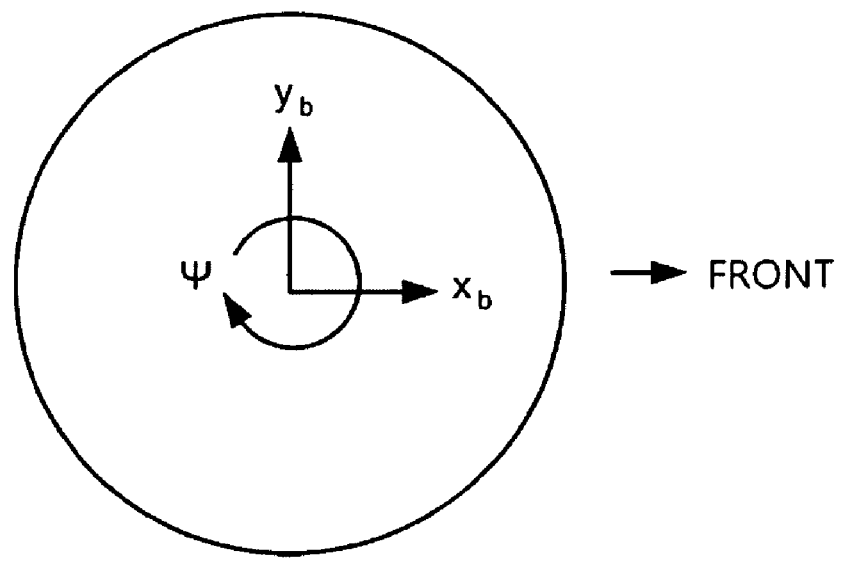
FIGS. 2 through 4 illustrate schematic diagrams of various pairs of coordinate axes for various aspects of a robot according to the embodiment of the present invention.
Figure 3:
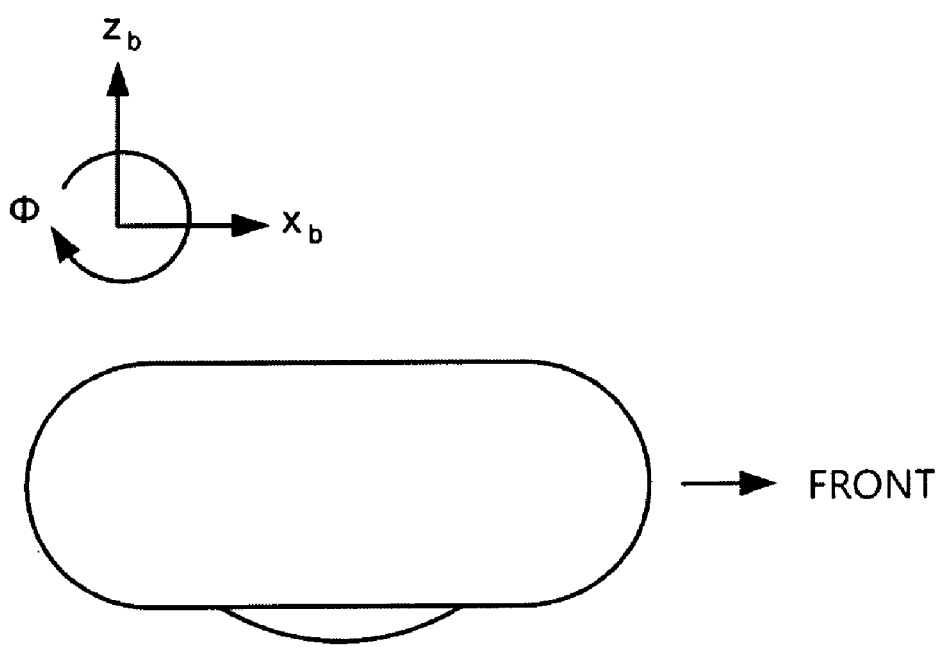
Figure 4:
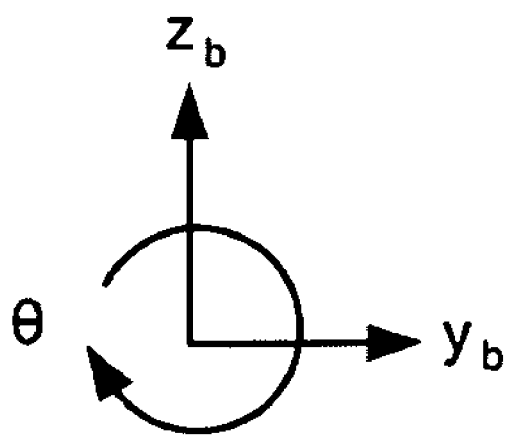
Figure 4:
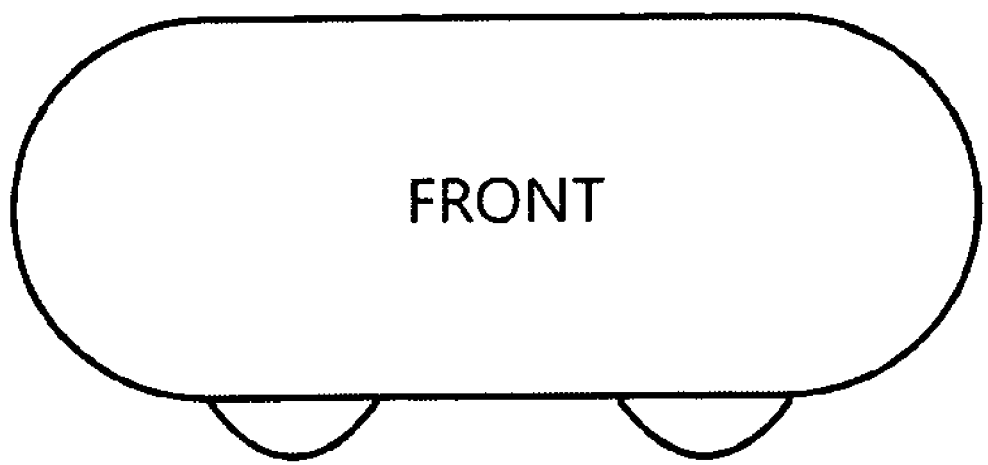

In the present embodiment, x, y, and z indicate absolute coordinate axes, $x_b$, $y_b$ and $z_b$ indicate main body coordinate axes fixed to the robot, and $\theta$, $\phi$, and $\psi$ indicate rotation angles from the coordinate axes $x_b$, $y_b$ and $z_b$. Specifically, referring to FIG. 2, the top of a robot may be represented by the axes $x_b$ and $y_b$ and the rotation angle $\psi$. Referring to FIG. 3, a side of the robot may be represented by the axes $x_b$ and $z_b$ and the rotation angle $\phi$. Referring to FIG. 4, the front of a robot may be represented by the coordinate axes $y_b$ and $z_b$ and the rotation angle $\theta$.

The state variable calculation module 110 may include a first Kalman filter 111 which calculates a state variable for the normal state and a second Kalman filter 112 which calculates a state variable for the slip state.

Figure 5:
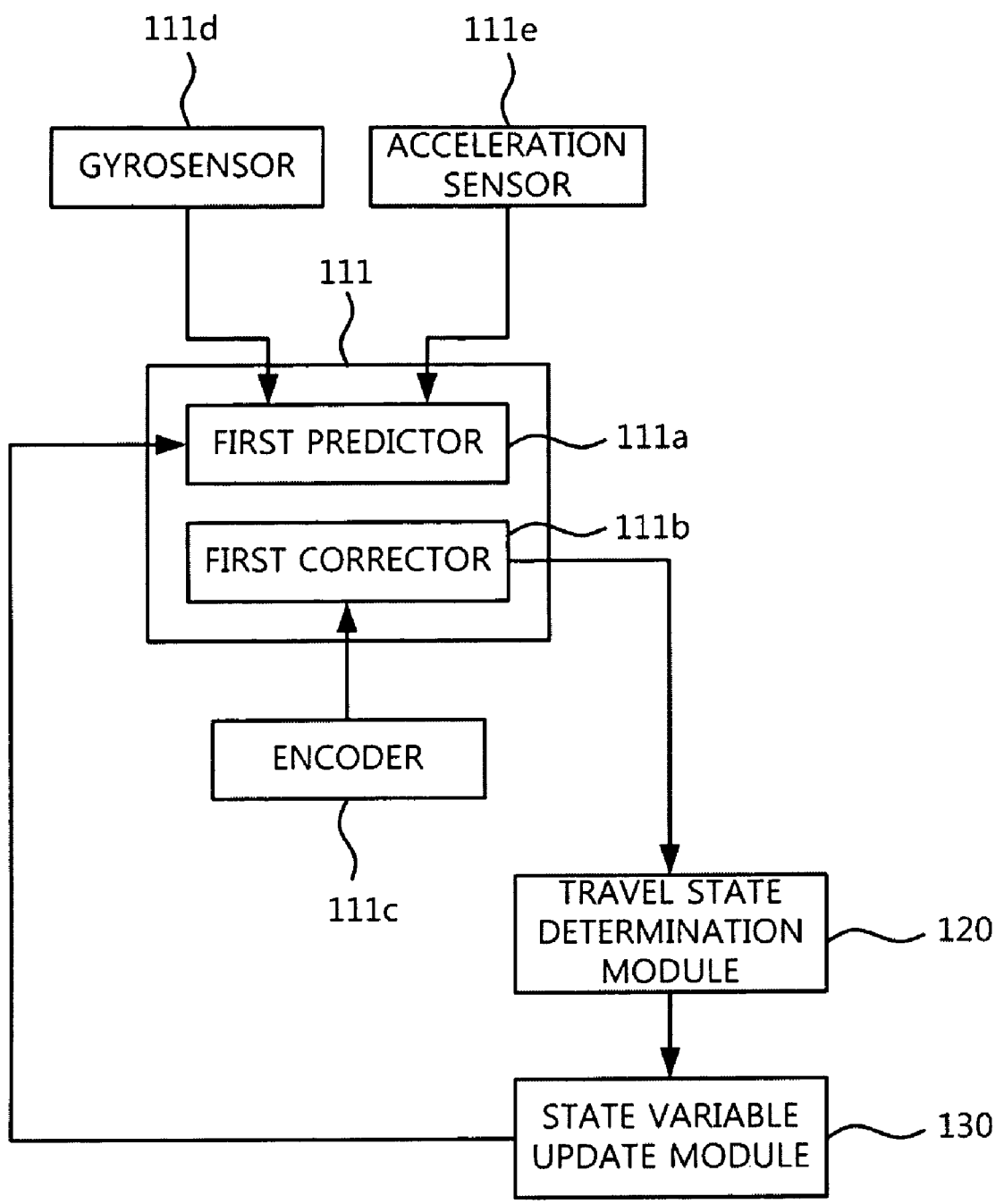
FIG. 5 illustrates a block diagram of the first Kalman filter illustrated in FIG. 1.

Referring to FIG. 5, the first Kalman filter 111 may include a first predictor 111a and a first corrector 111b. The first Kalman filter 111 performs its operation mainly based on information provided by an encoder 111c because information provided by the encoder 111c is very reliable when a robot is in the normal state. The first Kalman filter 111 may also include one or more inertial sensors such as a gyrosensor 111d and an acceleration sensor 111e. When the robot is in the normal state, errors in measurement data provided by the first Kalman filter 111 may accumulate over time due to the inaccuracy of the acceleration sensor 111e. Therefore, when the robot is in the normal state, the position of the robot may be calculated mainly using information provided by the encoder 111c while minimizing the influence of the acceleration sensor 111e.

The design of the first Kalman filter 111 when the robot is in the normal state will hereinafter be described in detail. A state variable $X^1$ and a system input $u^1$ for the normal state are as indicated by the following equations: $X^1=(x,y,v^x,a^x,v^y,a^y,\psi,\phi,\theta,\omega^z,\omega^y,\omega^x)^T$; and $u^1=(a_k^{x,acc},a_k^{y,acc},\omega_k^{x,acc},\omega_k^{y,acc},z_k^{z,acc})^T$ where v indicates velocity, a indicates acceleration, $\psi$, $\phi$, and $\theta$ indicate orientations, $\omega$ indicates angular velocity, x, y, and z indicate axial direction components, $a_k^{x,acc}$ and $a_k^{y,acc}$ indicate accelerations with respect to the axes $x_b$ and $z_b$, as measured by the acceleration sensor 111e, and $\omega_k^{x,gyro}$, $\omega_k^{y,gyro}$, and $\omega_k^{z,gyro}$ indicate angular velocities with respect to the axes $x_b$, $y_b$ and $z_b$, as measured by the gyrosensor 111d. T refers to transpose, $f^1$ refers to a function and "$^1$" refers to the first model. A state variable equation for the normal state is as indicated by the equation: $X_{k+1}^1=f^1(X_k^1,u_k^1)+\xi^1$. Each component of the state variable $X^1$ is defined by Equation (1):

$$x_{k+1} = x_k + \left(v_k^x \Delta t + \frac{1}{2}a_k^x \Delta t^2\right)\cos(\tilde{\psi}_k)\cos(\tilde{\phi}_k) -$$

$$\left(v_k^y \Delta t + \frac{1}{2}a_k^y \Delta t^2\right)\sin(\tilde{\psi}_k)\cos(\tilde{\theta}_k) + \xi_1^1$$

$$y_{k+1} = y_k + \left(v_k^x \Delta t + \frac{1}{2}a_k^x \Delta t^2\right)\sin(\tilde{\psi}_k)\cos(\tilde{\phi}_k) +$$

$$\left(v_k^y \Delta t + \frac{1}{2}a_k^y \Delta t^2\right)\cos(\tilde{\psi}_k)\cos(\tilde{\theta}_k) + \xi_2^1$$

$$v_{k+1}^x = v_k^x + a_k^x \Delta t + \xi_3^1$$

$$a_{k+1}^x = a_k^{x,acc} + |g|\sin(\tilde{\phi}_k) + \xi_4^1$$

$$v_{k+1}^y = v_k^y + a_k^y \Delta t + \xi_5^1$$

$$a_{k+1}^y = a_k^{y,acc} - |g|\cos(\tilde{\phi}_k)\sin(\tilde{\theta}_k) + \xi_6^1$$

$$(\psi_{k+1}, \phi_{k+1}, \theta_{k+1})^T = (\psi_k, \phi_k, \theta_k)^T + (\omega_k^x \Delta t, \omega_k^y \Delta t, \omega_k^z \Delta t)^T + (\xi_7^1, \xi_8^1, \xi_9^1)^T$$

$$(\omega_{k+1}^x, \omega_{k+1}^y, \omega_{k+1}^z)^T = (\omega_k^{x,gyro}, \omega_k^{y,gyro}, \omega_k^{z,gyro})^T + (\xi_{10}^1, \xi_{11}^1, \xi_{12}^1)^T$$

where $\tilde{\psi}_k$, $\tilde{\phi}_k$, and $\tilde{\theta}_k$ indicate average velocities of the robot during a sampling period $\Delta t$, $\xi_i^1$ indicates a white noise process vector, $|g|$ indicates gravitational acceleration, and i indicates the index of each component of the state variable $X^1$. The average velocities $\tilde{\psi}_k$, $\tilde{\phi}_k$, and $\tilde{\theta}_k$ satisfy the following equations: $\tilde{\psi}_k=(\psi_k+\psi_{k+1})/2$; $\tilde{\phi}_k=(\phi_k+\phi_{k+1})/2$; and $\tilde{\theta}_k=(\theta_k+\theta_{k+1})/2$.

A set $z_k^1$ of measured values provided by the first Kalman filter 111 may be represented by the following equation: $z_k^1=(v_k^{x,encoder},v_k^{y,encoder},\omega_k^{z,encoder})$ where $v_k^{x,encoder}$ and $v_k^{y,encoder}$ indicate the velocities of the robot with respect to the directions of the coordinate axes $x_b$ and $y_b$, as measured by the encoder 111c, and $\omega_k^{z,encoder}$ is the angular velocity of the robot with respect to the direction of the coordinate axis $z_b$, as measured by the encoder 111c. A measurement equation of the first Kalman filter 111 is as indicated by the following equation: $z_k^1 = H_1 X_k^1 + \eta^1$ where $\eta^1$ indicates a white noise process vector. H is a matrix to convert the status variable into the measured value. For example, if H=[0 0 1 0 1 0 0 0 0 1 0 0], then z=H X. Each of the measured values in the measured value set $z_k^1$ is represented by Equation (2):

$$v_k^{x,encoder} = v_k^x + \eta_1^1$$
$$v_k^{y,encoder} = v_k^y + \eta_2^1$$
$$\omega_k^{z,encoder} = \omega_k^z + \eta_3^1$$

where i indicates the index of each of the measured values in the measured value set $z_k^1$ provided by the first Kalman filter 111.

Figure 6:
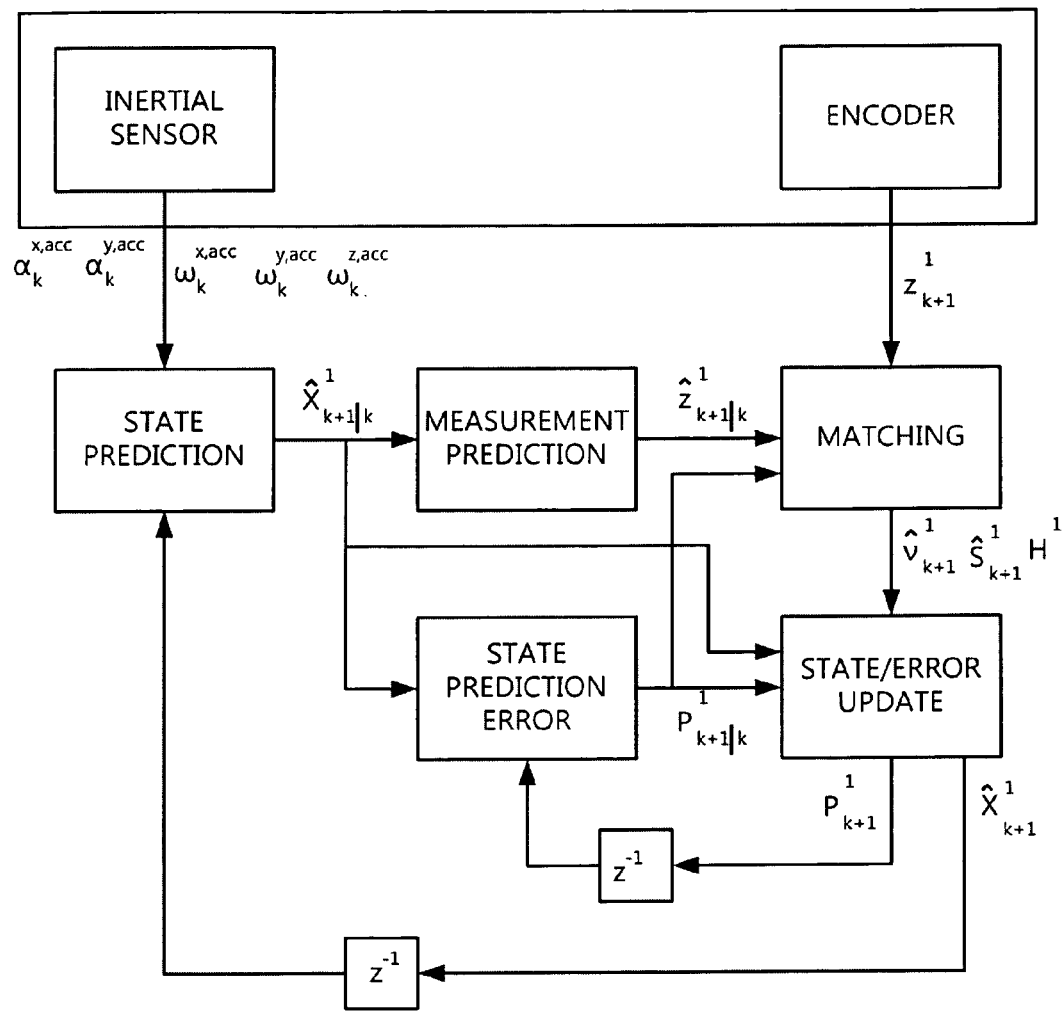
FIG. 6 illustrates a block diagram for explaining the operation of the first Kalman filter illustrated in FIG. 5.

The operation of the first Kalman filter 111 is as illustrated in FIG. 6.

Figure 7:
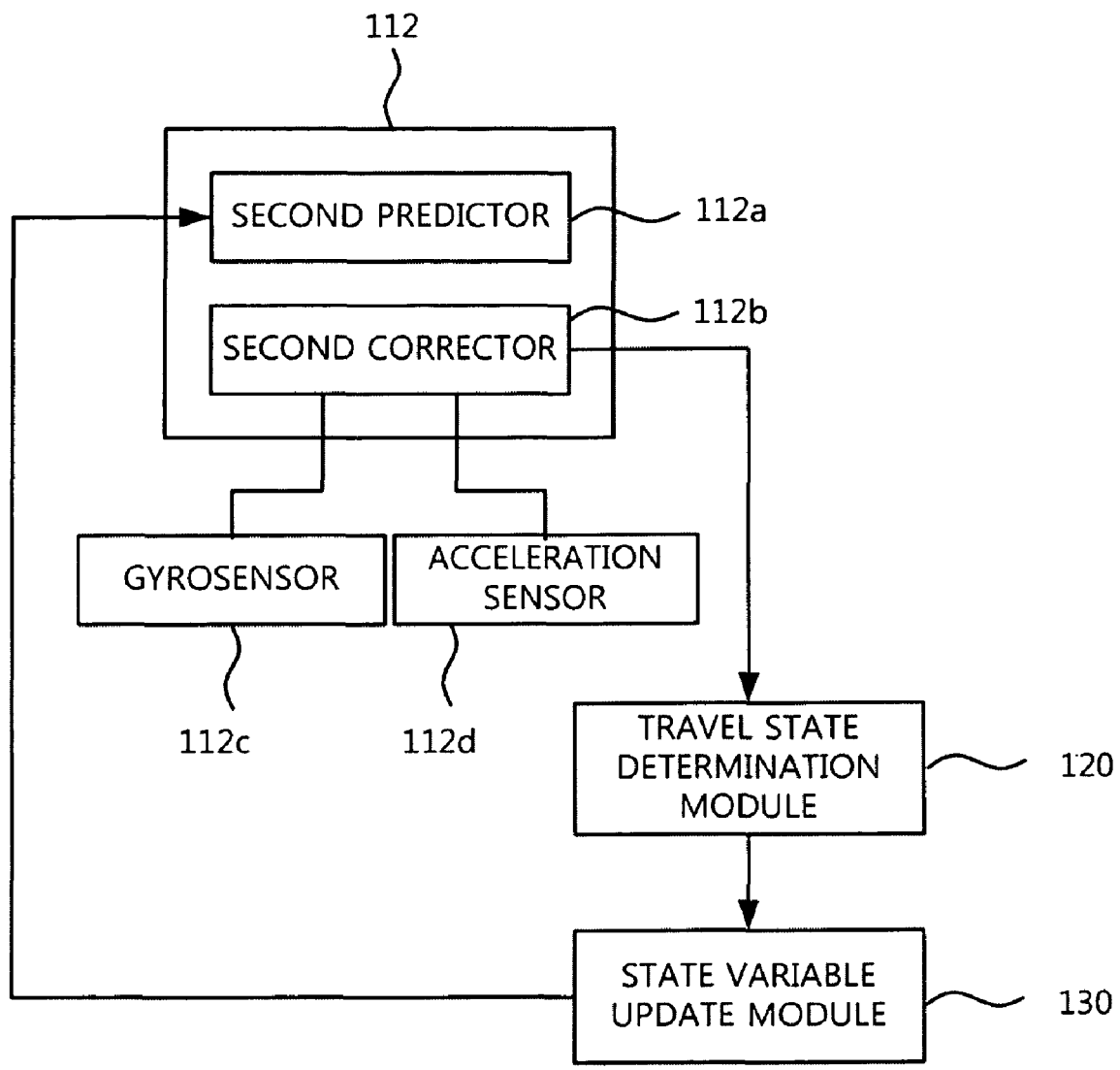
FIG. 7 illustrates a block diagram of the second Kalman filter illustrated in FIG. 1.

Referring to FIG. 7, the second Kalman filter 112 includes a second predictor 112a and a second corrector 112b. Since information provided by an encoder is relatively imprecise when the robot is in the slip state, the second Kalman filter 112 mainly uses information provided by an acceleration sensor 112d and a gyrosensor 112c.

The design of the second Kalman filter 112 when the robot is in the slip state will hereinafter be described in detail. A state variable $X^2$ and a state variable equation for the slip state are as indicated by the equations: $X^2=(x,y,v^x,a^x,v^y,a^y,\psi,\phi,\theta,\omega^z,\omega^y,\omega^x)^T$; and $X_{k+1}^2 = f^2(X_k^2) + \xi^2$. Each component of the state variable $X^2$ is represented by Equation (3):

$$x_{k+1} = x_k + \left(v_k^x \Delta t + \frac{1}{2}a_k^x \Delta t^2\right)\cos(\tilde{\psi}_k)\cos(\tilde{\phi}_k) -$$
$$\left(v_k^y \Delta t + \frac{1}{2}a_k^y \Delta t^2\right)\sin(\tilde{\psi}_k)\cos(\tilde{\theta}_k) + \xi_1^2$$
$$y_{k+1} = y_k + \left(v_k^x \Delta t + \frac{1}{2}a_k^x \Delta t^2\right)\sin(\tilde{\psi}_k)\cos(\tilde{\phi}_k) +$$
$$\left(v_k^y \Delta t + \frac{1}{2}a_k^y \Delta t^2\right)\cos(\tilde{\psi}_k)\cos(\tilde{\theta}_k) + \xi_2^2$$
$$v_{k+1}^x = v_k^x + a_k^x \Delta t + \xi_3^2$$
$$a_{k+1}^x = a_k^x + \xi_4^2$$
$$v_{k+1}^y = v_k^y + a_k^y \Delta t + \xi_5^2$$
$$a_{k+1}^y = a_k^y + \xi_6^2$$
$$(\psi_{k+1}, \phi_{k+1}, \theta_{k+1})^T =$$
$$(\psi_k, \phi_k, \theta_k)^T + (\omega_k^x \Delta t, \omega_k^y \Delta t, \omega_k^z \Delta t)^T + (\xi_7^2, \xi_8^2, \xi_9^2)^T$$
$$(\omega_{k+1}^x, \omega_{k+1}^y, \omega_{k+1}^z)^T = (\omega_k^x, \omega_k^y, \omega_k^z)^T + (\xi_{10}^2, \xi_{11}^2, \xi_{12}^2)^T.$$

Figure 8:
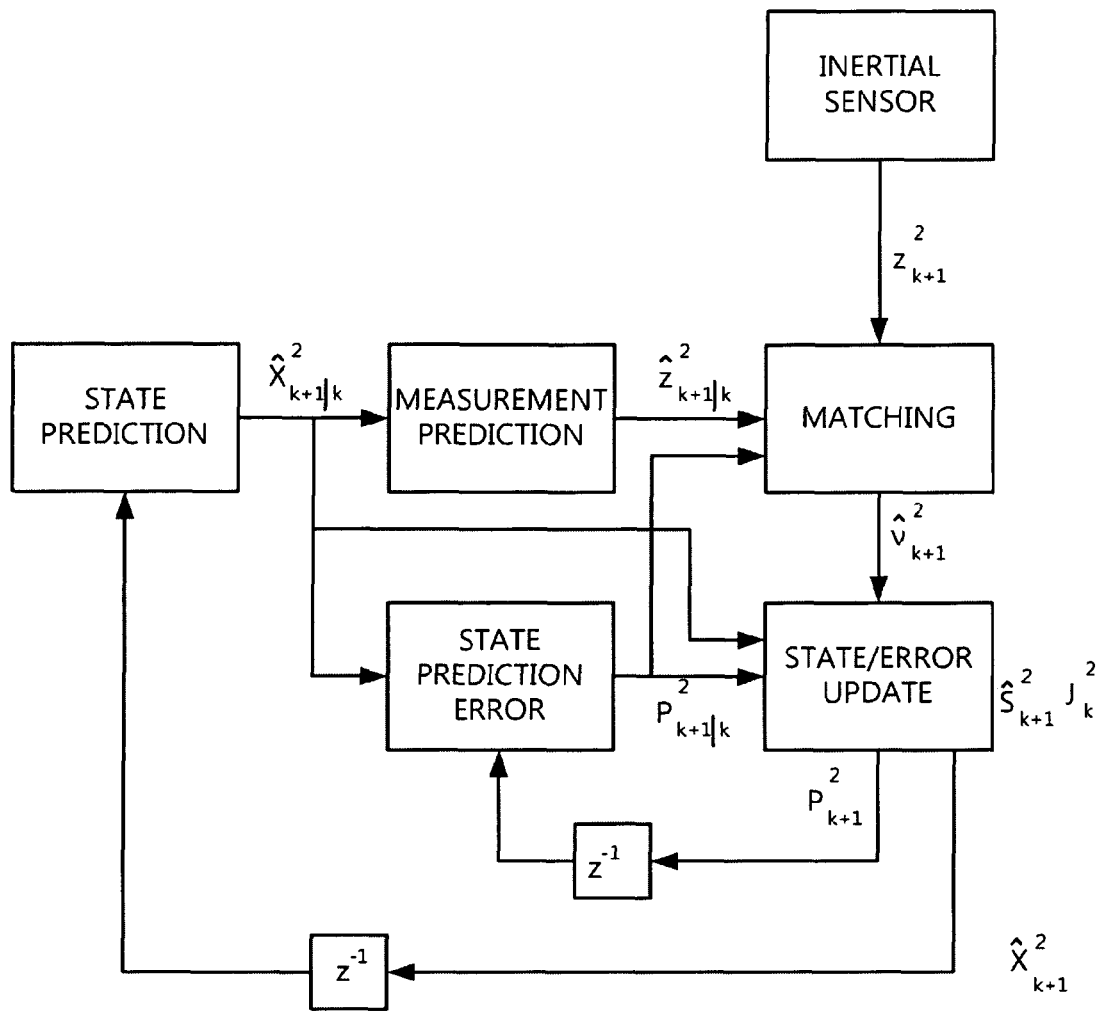
FIG. 8 illustrates a block diagram for explaining the operation of the second Kalman filter illustrated in FIG. 7.

A set $z_k^2$ of measured values provided by the second Kalman filter 112 is as indicated by the equation: $z_k^2 = (a_k^{x,acc}, a_k^{y,acc}, \omega_k^{x,acc}, \omega_k^{y,acc}, \omega_k^{z,acc}, v_k^{y,virtual})$ where $v_k^{y,virtual}$ indicates a virtual velocity of the robot with respect to the direction of the coordinate axis $y_b$. Since the robot cannot move toward the direction of the coordinate axis $y_b$, the virtual velocity $v_k^{y,virtual}$ of the robot is approximately 0. A measurement equation of the second Kalman filter 112 is represented by: $z_k^2 = H_2 X_k^2 + \eta^2$. Each of the measured values in the measured value set $z_k^2$ provided by the second Kalman filter 112 are represented by Equation (4);

$$a_k^{x,acc} = a_k^x - |g|\sin(\phi) + \eta_1^2$$
$$a_k^{y,acc} = a_k^y - |g|\cos(\phi)\sin(\theta) + \eta_2^2$$
$$\omega_k^{x,gyro} = \omega_k^x + \eta_3^2$$
$$\omega_k^{y,gyro} = \omega_k^y + \eta_4^2 \omega_k^{z,gyro} = \omega_k^z + \eta_5^2$$
$$v_k^{y,virtual} = v_k^y + \eta_6^2$$

where $\eta^2$ indicates a measured white noise process vector. The operation of the second Kalman filter 112 is as illustrated in FIG. 8.

Referring to FIG. 1, the travel state determination module 120 may determine the travel state of the robot based on state variables provided by the state variable calculation module 110, i.e., state variables provided by the first and second Kalman filters 111 and 112, and apply different weights to the state variables provided by the first and second Kalman filters 111 and 112 according to the result of the determination.

Specifically, the travel state determination module 120 calculates a probability density function for the situation when the robot is currently in travel state j. The probability density function is represented by the following equation: $\Lambda_k^j = p[z_k^j | Z_{k-1}^j, M^j] = N[v_k^j; 0, S_k^j]$ where the past condition $Z_{k-1}^j \equiv \{z_i^j\}_{i=1}^{k-1}$, $M^j$ indicates the mode j, $N(\bullet)$ denotes the normal pdf with argument $v_k^j$, mean 0, and variance $S_k^j$. Thereafter, the travel state determination module 120 calculates the probability of the robot currently being in travel state j, as indicated by the following equation:

$$\mu_k^j = P\{M^j | Z_{k-1}^j\} = \frac{1}{c}\Lambda_k^j \sum_{i=1}^{2} P_{ij}\mu_{k-1}^i$$

where Pij indicates the probability of the robot currently being in a given travel state and c is a normalization constant. The probability Pij satisfies the following equation: $P_{ij} = P\{M_k = M^i | M_{k-1} = M_j\}$.

By using the probabilities of the robot currently being in the normal state and the slip state, respectively, it is possible to calculate the position of the robot by mainly focusing on the state variable provided by the first Kalman filter 111 if the robot is in the normal state and mainly focusing on the state variable provided by the second Kalman filter 112 if the robot is in the slip state.

The state variable update module 130 obtains an updated state variable $\hat{X}_k$ by applying the probability of the robot currently being in each travel state, i.e., the weights provided by the travel state determination module 120, to the state variables provided by the first and second Kalman filters 111 and 112. The updated state variable $\hat{X}_k$ is represented by the following equation: $\hat{X}_k = \mu_k^1 \hat{X}_k^1 + \mu_k^2 \hat{X}_k^2$.

The apparatus 100 repeatedly performs the above-mentioned processes until the error $P_k$ between a predicted value and a measured value is minimized. The error $P_k$ is represented by the following equation:

$$P_k = \sum_{j=1}^{2} \mu_k^j \{P_k^j + [\hat{X}_k^j - \hat{X}_k][\hat{X}_k^j - \hat{X}_k]^T\}.$$

That is, the updated state variable obtained by the state variable update module 130 is input to the first and second Kalman filters 112, and the above-mentioned processes may be performed repeatedly until the error $P_k$ is minimized.

Figure 9:
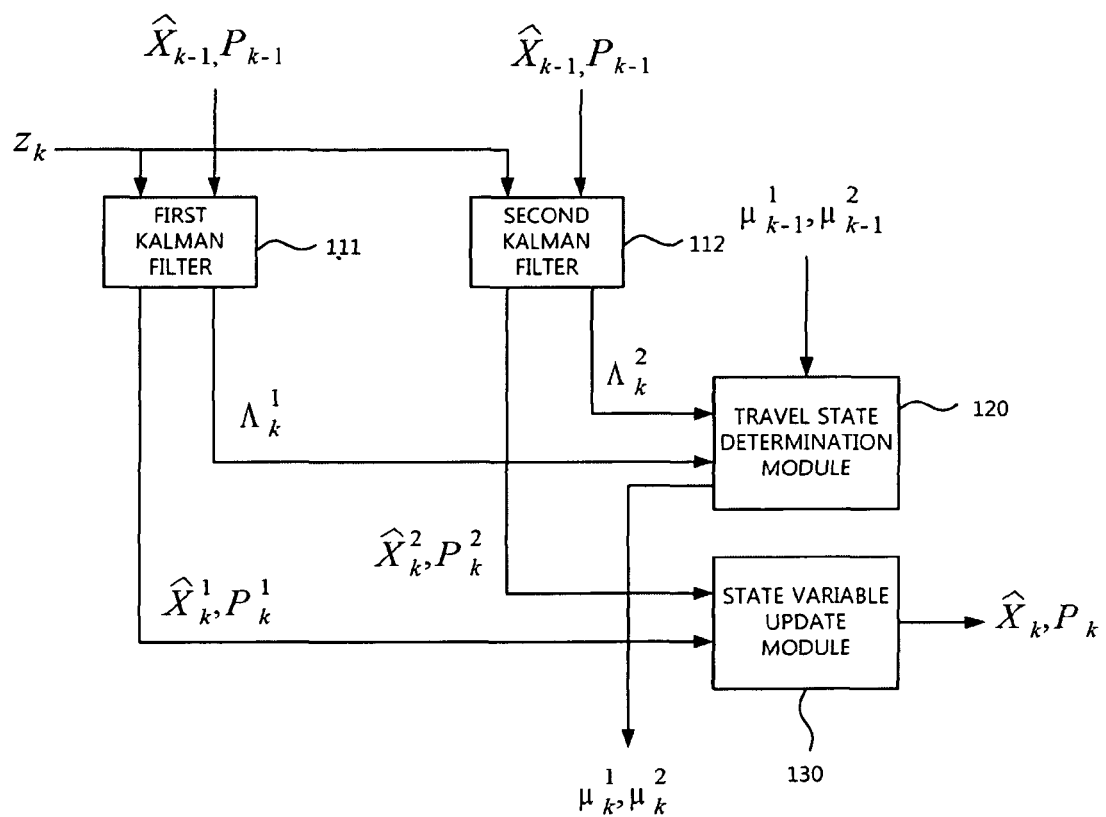
FIG. 9 illustrates a block diagram for explaining the update of state variables according to the embodiment of the present invention.

FIG. 9 illustrates a block diagram for explaining the update of state variables according to an embodiment of the present invention. Referring to FIG. 9, a state variable and an error for a time (k−1) are input to each of the first and second Kalman filters 111 and 112. Then, the travel state determination module 120 calculates probabilities $\mu_k^1$ and $\mu_k^2$ regarding a current travel state of a robot based on state variables provided by the first and second Kalman filters 111 and 112. Thereafter, the state variable update module 130 updates the state variables provided by the first and second Kalman filters 111 and 112 by applying the probabilities $\mu_k^1$ and $\mu_k^2$. The probabilities $\mu_k^1$ and $\mu_k^2$ may be interpreted as being the probabilities of the robot currently being in the normal state and the slip state, respectively.

FIG. 10 illustrates a flowchart of a method of calculating the position of a robot according to an embodiment of the present invention. Referring to FIG. 10, the first Kalman filter 111 calculates a state variable for the normal state, and the second Kalman filter 112 calculates a state variable for the slip state (S110). Since the first Kalman filter 111 is used for the normal state and the second Kalman filter 112 is used for the slip state, the first Kalman filter 111 performs its operation mainly based on information provided by the encoder 111c, and the second Kalman filter 112 performs its operation mainly based on information provided by one or more inertial sensors.

The travel state determination module 120 calculates the probability of a robot currently being in the normal state and the probability of the robot currently being in the slip state based on the state variables provided by the first and second Kalman filters 111 and 112 (S120).

The state variable update module 130 obtains an updated state variable by applying the results of the calculation performed in operation S120 to the state variables provided by the first and second Kalman filters 111 and 112 (S130).

The term "module", as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

As described above, according to embodiments of the present invention, it is possible to precisely determine the position of a robot and create a map of the surroundings of the robot by using a plurality of Kalman filters according to the travel state of the robot.

Although an embodiment has been shown and described, it would be appreciated by those skilled in the art that changes may be made in this embodiment without departing from the principles and spirit of the invention, the scope of which is defined in the claims and their equivalents.

What is claimed is:

1. An apparatus to calculate a position of a robot, comprising:
    a state variable calculation module which calculates a plurality of state variables regarding a plurality of possible travel states of the robot, comprising a plurality of Kalman filters;
    a travel state determination module which determines a travel state from among the plurality of possible travel states of the robot based on the calculated state variables; and
    a state variable update module which updates the state variables according to the determined travel state,
    wherein the plurality of possible travel states include a normal state and a slip state.

2. The apparatus of claim 1, wherein the state variable calculation module comprises a first Kalman filter and a second Kalman filter.

3. The apparatus of claim 2, wherein the first Kalman filter comprises a first predictor and a first corrector and the apparatus further comprises an encoder in communication with the first corrector and an inertial sensor in communication with the first predictor.

4. The apparatus of claim 2, wherein the second Kalman filter comprises a second predictor and a second corrector and the apparatus further comprises an inertial sensor in communication with the second corrector.

5. The apparatus of claim 4, wherein the second Kalman filter further comprises an encoder.

6. The apparatus of claim 2, wherein the travel state determination module determines whether the travel state of the robot is the normal state or the slip state based on the state variables provided by the first and second Kalman filters.

7. The apparatus of claim 2, wherein the travel state determination module applies different weights to the state variables provided by the first and second Kalman filters according to whether the travel state of the robot is the normal state or the slip state.

8. The apparatus of claim 7, wherein the state variable update module generates an updated state variable by combining the state variables to which the different weights are applied.

9. The apparatus of claim 8, wherein the state variable calculation module calculates a state variable for the normal state and a state variable for the slip state based on the updated state variable.

10. The apparatus of claim 1, wherein the slip state is a state in which one or more wheels of the robot slips, and a measured displacement of the robot corresponding to a rotation of the one or more wheels of the robot does not correspond to an actual displacement of the robot due to the slipping.

11. The apparatus of claim 1, wherein the travel state determination module calculates a probability density function for each of the plurality of possible travel states, and calculates a probability of the robot currently being in each of the plurality of possible travel states, to determine the travel state.

12. A method of calculating a position of a robot, comprising:
    calculating a plurality of state variables regarding a plurality of possible travel states of the robot;
    determining, by one or more processors, a travel state of the robot from among the plurality of possible travel states based on the calculating; and
    updating the state variables according to the determining,
    wherein the plurality of possible travel states include a normal state and a slip state.

13. The method of claim 12, wherein the calculating comprises calculating the state variables using a first Kalman filter and a second Kalman filter.

14. The method of claim 13, wherein the first Kalman filter comprises a first predictor and a first corrector and the calculating comprises using an encoder and an inertial sensor.

15. The method of claim 13, wherein the second Kalman filter comprises a second predictor and a second corrector and the calculating comprises using an inertial sensor.

16. The method of claim 15, wherein the second Kalman filter further comprises an encoder.

17. The method of claim 13, wherein the determining comprises determining whether the travel state of the robot is the normal state or the slip state based on the state variables calculated by the first and second Kalman filters.

18. The method of claim 13, wherein the determining comprises applying different weights to the state variables calculated by the first and second Kalman filters according to whether the travel state of the robot is the normal state or the slip state.

19. The method of claim 18, wherein the updating comprises generating an updated state variable by combining the state variables to which the different weights are applied.

20. The method of claim 19, wherein the calculating comprises calculating a state variable for the normal state and a state variable for the slip state based on the updated state variable.

* * * * *